United States Patent Office 3,645,963
Patented Feb. 29, 1972

3,645,963
POLYMERS STABILIZED WITH POLYMETHYLENE SULFIDE
Adam F. Kopacki, Westwood, N.J., and Nathaniel L. Remes, Yonkers, N.Y., assignors to Stauffer Chemical Company, New York, N.Y.
No Drawing. Continuation of application Ser. No. 684,946, Nov. 22, 1967. This application Jan. 19, 1970, Ser. No. 4,459
Int. Cl. C08f 45/58
U.S. Cl. 260—45.7 S                 6 Claims

ABSTRACT OF THE DISCLOSURE

A solid polymeric composition consisting essentially of a solid polymer selected from the class consisting of a hydrocarbon polymer, a substituted hydrocarbon polymer, a polyester, a vinyl polymer and copolymers and terpolymers thereof, stabilized against ultraviolet rays by incorporating therein a stabilizing quantity of a polyalkylene sulfide.

---

This application is a continuation of application Ser. No. 684,946, filed Nov. 22, 1967, now abandoned.

BACKGROUND OF THE INVENTION

It is well known that plastics and polymeric materials generally are susceptible to a characteristic type of degradation when exposed to sunlight or other sources of ultraviolet rays. Although the effect varies with different materials, it commonly manifests itself initially as a weakening of the tensile strength of the polymer, which on continued exposure becomes increasingly brittle until a point is reached at which mechanical failure occurs. In some instances, the polymer may be transformed into a powdery mass often accompanied by intense darkening.

There have been numerous proposals for producing plastics having increased durability in the presence of ultraviolet radiation. The most familiar of these proposals consists of blending the plastic or polymer with a material which in itself is a strong ultraviolet absorber. It is this latter property which apparently affords protection of the plastic from the damaging radiation. In fact, it is customary to refer to the aforesaid additives as ultraviolet stabilizers. Because of their inherently poor resistance to ultraviolet light, the successful commercialization of synthetic polymers is tied in closely with the development of a suitable stabilizer.

Whereas the principal function of an ultraviolet stabilizer is that it provide protection of the polymer, certain ancillary features and characteristics are also necessary. It is, for instance, highly important that the stabilizer should not modify or cause adverse changes in the polymer. A particularly vexious characteristic of many plastic additives is their tendency to impart color or stain to the polymer in which they are incorporated, ultraviolet stabilizers being especially prone to this type of behavior. Such side effects cannot be tolerated where a clear or colorless polymer is needed. Even pigmented or dyed plastic materials are detrimentally affected by stabilizer staining since it causes over-all color degradation. Other understandable side effects often encountered are odor production, softening, bleeding and the like. From a commercial standpoint, it is desirable that the stabilizer be readily available or economical to manufacture.

BRIEF DESCRIPTION OF THE INVENTION

It has been discovered that excellent ultraviolet stabilization of polymers can be achieved without encountering the aforesaid undesirable side effects by incorporating into the polymer a polyalkylene sulfide having the following formula:

$$(R-S)_n$$

wherein R may be selected from the group consisting of methylene, ethylene, propylene, isopropylene, butylene and isobutylene and wherein $n$ can range between 2 and 5,000.

DETAILED DESCRIPTION OF THE INVENTION

In practicing the present invention, the liquid polyalkylene sulfide is blended or incorporated into the polymer by any of the conventional methods commonly used for mixing such materials with resins and plastics. A typical procedure comprises milling on heated rolls, although deposition from solvents and dry blending are well known techniques. The polyalkylene sulfides are known chemical entities, the description and preparation of which can be found in the technical and chemical literature. The polyalkylene sulfides useable may be selected from the group consisting of poly(methylene sulfide), poly(ethylene sulfide), poly(propylene sulfide), poly(isopropylene sulfide), poly(butylene sulfide), poly(isobutylene sulfide) and mixtures thereof.

In testing the stabilizers of this invention, it has been found that they are singularly effective in proecting poly-α-olefins, diolefins, copolymers of olefins or olefins and diolefins and other hydrocarbon polymers, polymers of substituted vinyl compounds and polyesters against deterioration due to exposure from ultraviolet radiation. The polymer compositions stabilized in accordance with the invention exhibited an extended life expectancy and are much more useful and practical than unstabilized polymers and possess a wide diversity of uses including installations requiring prolonged exposure to sunlight and the elements. Moreover, the polyalkylene sulfide, although inordinately effective as a ultraviolet stabilizer, does not produce any undesirable side effects. Even after exposure periods exceeding 900 hours, test samples of polymers showed a slight loss of mechanical strength while remaining substantially free of stain or coloration.

The polymer stabilized as contemplated herein can be cast, extruded, rolled or molded into sheets, rods, tubes, piping, filaments and other shaped articles, including sheets or films ranging from 0.5 to 100 mils in thickness. The polymer compositions of this invention can be applied as coatings to paper, cloth, wire, metal foil and are suitable for manufacture of synthetic fibers and fabrics. Although the quantity of stabilizer is not particularly critical, it is recommended that the concentration based on the weight of the polymer be maintained in the neighborhood of between 0.1% to about 10.0% by weight.

The polyalkylene sulfides as described herein are suitable for a stabilizing a wide variety of solid polymer compositions against deterioration brought on by exposure to ultraviolet radiation. In this connection, mention is made of any of the normally solid polymers derived from the polymerization of α-mono-olefinic aliphatic and aryl-substituted aliphatic hydrocarbons containing from 2 to 10 carbon atoms. Typical poly-α-olefins include polyethylene, polypropylene, poly(3-methylbutene-1) poly(4-methylbutene-1), poly(4-methylpentene-1), poly(pentene-1), poly(3,3-dimethylbutene-1), poly(4,4-dimethylbutene-1), poly(octene-1), poly(decene-1), polystyrene and the like. Copolymers of such olefins as those prepared from ethylene and propylene or ethylene and the butenes or the like are also protected as are polydiolefins, i.e., polybutadiene or polyisopropene and olefin-diolefin copolymers of the type as butadiene-styrene or isobutylene-isoprene copolymers. Polymeric materials prepared from olefins and/or diolefins containing some vinylinic monomers such as acrylonitrile or vinyl chloride as illustrated by the so-called ABS resins, acrylonitrile, butadiene and styrene terpolymers, are considered to be within the scope of this invention as are polymers of substituted vinyl monomers such as vinyl chloride, vinylidene dichloride, vinyl acetate, acrylonitrile and the like. Polyester resins with or without added styrene, divinyl benzene and the like are also stabilized by means of the polyalkylene sulfide.

The stabilizers of this invention are particularly useful for preventing photo-degradation by ultraviolet light or sunlight of stereo regular polyolefins such as isotactic polypropylene. Isotactic polypropylene is a stereoregular polymer wherein the monomeric units are linked predominantly head to tail with the methyl groups on one side of the helical chain rather than the more common arrangement with methyl groups randomly distributed on both sides of the chain. Moreover, this isotactic or singular arrangement of substituents attached to the chain promotes an orderly alignment of the molecules. Such stereoregular polymers often exhibit a high degree of crystallinity and are superior in physical properties to atactic polymers having a random distribution of the monomeric units. Stereoblock polymers wherein long segments of the chain are in one configuration or the other and also polymers with amorphous regions are also protected. For a fuller description of such polymers, reference is made to the Scientific American, 197 No. 3 pages 98 to 104 (1957); 205 No. 2, pages 33 to 41 (1961). Amorphous or appreciably amorphous polymers are also stabilized.

Although the molecular weight of polymers varies over wide limits, the stabilizer compounds of this invention are not restricted to any particular molecular weight range of polymer, and in fact it has been found that excellent protection can be realized with polymers having a broad or narrow range. Moreover, the so-called amorphous low molecular weight poly-$\alpha$-olefin waxes or oils are likewise susceptible to stabilization by means of the compound of this invention.

Polyesters which can be protected against ultraviolet radiation by means of the polyalkylene sulfide are well known chemical entities and are described at length in technical literature and numerous U.S. patents. One type of polyester is derived from the addition polymerization of ethylenically unsaturated organic esters, particularly vinyl ester monomers, and in this connection mention is made of acrylic esters, vinyl esters, and the like. The polymerization is commonly effectuated by contacting the monomer with a polymerization initiator such as an organic peroxide with or without the application of heat.

Another type of polyester which can be stabilized in accordance with this invention is formed by the successive esterification of dicarboxylic acids with polyglycols. The resulting polymeric esters consist of alternate linkages of the dicarboxylic acid and polyglycol residues produced by the elimination of water from between the reactants. The resulting polymers may be linear or crosslinked, depending on the selection of the components. For instance, a diglycol wherein the hydroxyl groups are terminally situated produce a linear type of polyester whereas polyglycols as exemplified by glycerol give rise to a crosslinking polymer formed by reacting glycerol with the dicarboxylic acid, phthalic acid, in the form of its anhydride.

Modifications of polyesters are the well known alkyd resins which are obtained by forming a polyester by reacting a polyglycol and $\alpha$-$\beta$-ethylenically unsaturated di or polycarboxylic acid and crosslinking the residual ethylene double bond with a suitable crosslinking agent.

In a more specific and detailed sense, the alkyd resins as above referred to having a plurality of polymerizable $\alpha$-$\beta$-ethylenically unsaturated linkages may be produced by combining together a polyhydric alcohol with a polycarboxylic acid or its anhydride which contains $\alpha$-$\beta$-ethylenic unsaturation. It is generally understood that the acid or its anhydride includes the designation polycarboxylic acid and such terminology will be understood in the description as herein set forth. Saturated carboxylic acids are also frequently included in the reaction mixture for the purpose of modifying the properties of the resin. From the standpoint of cost, the unsaturated polycarboxylic acids most commonly used are maleic, usually in the form of anhydride, and fumaric acid. Other $\alpha$-$\beta$-unsaturated carboxylic acids which may be employed are exemplified by citraconic, itaconic, aconitic and mesaconic acids. The chemical and technical literature can be consulted for the names of other suitable acids. An acid often used for modifying the properties of a polyester resin is phthalic acid, commonly in the form of its anhydride. Other such acids with benzenoid or aromatic unsaturation which behave as saturated acids in that their benzenoid unsaturated structure does not enter into any common ethylenic type polymerization are commonly selected to produce various and particular properties and effects in the alkyd resin. In this connection, reference is made to such acids as isophthalic, adipic, azelaic, tetrachlorophthalic acid, sebacic, suberic, endomethylenetetrahydrophthalic and hexachloroendomethylenetetrahydrophthalic.

As illustrative of the polyhydric alcohols applicable for the synthesis of alkyd resins, mention is made of ethylene glycol, diethylene glycol, propylene glycols, dipropylene glycol, butylene glycol and the like. Here again, the literature may be consulted for the names of the less common polyglycols. It should be pointed out that as with the dicarboxylic acid, a polyglycol alcohol may be selected which is ethylenically unsaturated and thereby giving residual ethylenic double bonds for the purpose of crosslinking the polyester with concomitant modification in physical and chemical properties.

In preparing an alkyl resin, the polycarboxylic acid and appropriate polyhydric alcohol are commonly reacted at elevated temperatures in the presence of an inert atmosphere. The reaction is normally carried out at a temperature ranging from about 150° C. to about 230° C.; the inert atmosphere is conveniently provided by carbon dioxide or nitrogen gas. Generally, the total number of moles of alcohol exceed the total number of moles of acid by about 5 to 20% since the latter figures are required to effect complete esterification, although the proportions are not critical. A relatively inert organic solvent such as xylene is sometimes useful in carrying out the reaction. Since the reaction is an esterification, water is given off and should be removed from the system. After essentially all of the water has been expelled, any solvent is removed and after the mixture cooled, the appropriate unsaturated monomeric crosslinking agent added. If cross polymerization or linkage is to be prolonged, the presence of a suitable inhibitor is necessary.

Unsaturated monomers suitable for use as crosslinking agents can be selected from a wide variety of polymerizable compounds characterized by the presence of a

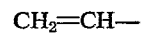

$CH_2=CH-$ group. Examples of such monomers are styrene, vinyl toluene, methyl acrylate, divinyl benzene, diallylphthalate, dimethyl styrene, methyl methacrylate, vinyl acetate, butadiene and the like. It is also a common practice to employ special monomers in order to secure particular effects. In this connection, mention is made of triallyl cyanurate useful in imparting high heat resistance to the resins, alkyl allyl diglycolate for use as a refractive modifier, while dialkyl phenylphosphonate has been employed to impart fire resistance.

Three groups of components which have been found particularly suitable and convenient for preparing polyesters are: (1) acids such as maleic, fumaric, itaconic, phthalic and the like; (2) alcohols or glycols such as allyl alcohol, ethylene glycol and diethylene glycols; (3) unsaturated hydrocarbons such as styrene; cyclopentadiene and the like. Also polyesters containing an alkenyl aryl crosslinking agent such as diallyl phthalate, and a reaction product of the $\alpha$-$\beta$-ethylenically unsaturated polycarboxylic acid, such as maleic or fumaric acid, a saturated polycarboxylic acid free of non-benzoid unsaturation, such as phthalic acid and at least one glycol such as ethylene glycol and/or diethylene glycol, may be used.

The amounts of the components useful in preparing polyesters may vary widely. In most instances, approximately two parts by weight an unsaturated alkyd resin to one part by weight of the monomeric crosslinking agent is suitable, although as above mentioned, the proportions may be varied over wide limits.

Another important polymer which can be stabilized in accordance with this invention is polyvinylchloride. This polymer is commonly produced by the emulsion polymerization using a redox initiator for polymerizing vinyl chloride. One type of polyvinylchloride is the so-called rigid or unplasticized polyvinylchloride and this particular modification of polyvinylchloride can be effectively stabilized by the compounds of the invention. As has been previously pointed out elsewhere herein, the polyalkylene sulfides are effective as stabilizers either for the polymers themselves or various copolymers and terpolymers and mixtures thereof. One class of polymer compositions which lend itself to stabilization by means of the compounds of the invention is resin mixtures which are blends or copolymers of a plastic such as polystyrene or styrene acrylonitrile copolymer with a rubber, usually a butadiene acrylonitrile copolymer. Such compositions may be intimate physical mixtures of the two components, the so-called poly blends or a true terpolymer, that is an ABS resin possibly produced by block or graft techniques. An example of the latter case is a graft copolymer of styrene or nitrile rubber. Typical compositions include 20 to 30% acrylonitrile, 20 to 30% butadiene and 40 to 60% styrene. The abbreviations ABS are taken from the initial letters of the three monomers.

For a more detailed description of the various polymers, copolymers and terpolymers which are susceptible to stabilization in accordance with this invention, they are described at great length in the technical and chemical publications. In this connection, reference is made to well known treatises as "Polyester Resins" by J. R. Lawrence, Reinhold Publication Corporation, New York (1960), and "Textbook of Polymer Science" by F. W. Billmeyer, published by Interscience Publishers, New York (1962).

The following exampes illustrate the procedure for preparing stabilized polymer compositions of the invention, although the inclusion of such examples is not to be taken as limiting or otherwise imposing any restriction on the invention, and it is to be understood that variations in practicing the same without departing from the scope or spirit thereof will be apparent to those skilled in the art to which this invention pertains.

EXAMPLE 1

A dry blend consisting of 0.5% by weight of poly(propylene sulfide) and 50 grams of unstabilized polypropylene was subjected to compression molding in the usual manner at a temperature of 400° F. for six minutes at 2,000 p.s.i. The blended polymer was compression molded into a 25 mil sheet and thereafter cut into square samples measuring two inches on the side. A like sample containing no stabilizer was also prepared and tested. The samples were then exposed in an Xenon Arc Weatherometer operating at 6,000 watts. The water cycle was adjusted whereby each sample was subjected to 18 minutes of water spray and 102 minutes of dry exposure for each two hours of exposure. Exposure damage to the sample of the polypropylene was assessed with respect to change of structural strength. After a period of exposure in excess of 900 hours, the test sheet of the polypropylene showed no signs of brittleness to 180° flexure test. Nor was there any evidence at this time of any surface crazing or any coloration or staining. The specimen of unstabilized polypropylene which was exposed concurrently with the stabilized product, failed the structural test after 350 to 400 hours exposure time. The Weatherometer used in compiling the data and test described herein was purchased from the Atlas Electric Device Company, Chicago, Ill. The instrument is identified as a 6,000 watt Xenon Weatherometer Model 60W. The polypropylene resin as used in the above described example is an unstabilized general purpose, high molecular weight polypropylene of the isotactic or crystalline type. Technically, it has a melt index of 4 at 230° C. and a specific gravity of 0.905. The resin was purchased from the Hercules Powder Company under the trade name of Profax and further identified as No. 6501, and is supplied in the form of natural flakes. Other commercially available grades of unsaturated isotactic polypropylene resins have been tested in accordance with this procedure with the result obtained being in general agreement.

EXAMPLE 2

The procedure of Example 1 was repeated but substituting polyethylene in lieu of polypropylene. In general, the results paralleled those obtained in the first example.

EXAMPLE 3

The procedure of Example 1 was repeated except that the polypropylene was replaced by polyvinylchloride. In general, the degree of stabilization was comparable to that obtained in the previous examples.

EXAMPLE 4

The procedure of Example 1 was repeated but in this case the polymer was a terpolymer obtained by polymerizing a mixture of acrylonitrile, butadiene and styrene. The terpolymer used in this example was of high impact type, commonly referred to in the trade as ABS polymers. The results obtained were in general agreement with Example 1.

EXAMPLE 5

This example describes the procedure for using the compounds of the present invention to stabilize a polyester of the alkyl type. Thus, 0.25 gram of poly(propylene sulfide) was mixed with 5 grams of styrene, followed by the addition of 0.5 gram of benzoyl peroxide. The blended components were next combined with 95 grams of Laminac 4123 purchased from the American Cyanamid Company. To effect curing of the Laminac 4123, the composition was placed between Pyrex glass plates, the edges sealed and the "sandwich" heated in an upright position at 80° C. for 30 minutes; then at 105° C. for 30 minutes and finally 1 hour at 120° C. The cured sample was removed from the mold, and placed in a Weatherometer for testing as described in Example 1. The degree of stabilization of the polymer was in line with the results obtained in the case of the first examples.

EXAMPLE 6

A dry blend conisting of 0.5% by weight of poly(methylene sulfide) and 50 grams of unstabilized polypropylene was subjected to compression molding in the usual manner at a temperature of 400° F. for six minutes at 2,000 p.s.i. The blended polymer was compression molded or extruded into a 25 mil sheet and thereafter cut into square samples measuring two inches on the side. A like sample containing no stabilizer was also prepared and tested. The samples were then exposed in an Xenon Arc Weatherometer operating at 6,000 watts. The water cycle was adjusted whereby each sample was subjected to 18 minutes of water spray and 102 minutes of dry exposure for each two hours of exposure. Exposure damage to the sample of the polypropylene was assessed with respect to change of structural strength. After a period of exposure in excess of 1100 hours, the test sheet of the polypropylene showed no signs of brittleness to 180° flexure test. Nor was there any evidence at this time of any surface crazing or any coloration or staining. The specimen of unstabilized polypropylene which was exposed concurrently with the stabilized product failed the structural test after 350 to 400 hours exposure time. The Weatherometer used in compiling the data and test described herein was purchased from the Atlas Electric Device Company, Chicago, Ill. The instrument is identified as a 6,000 watt Xenon Weatherometer Model 60W. The polypropylene resin as used in the above described example is an unstabilized general purpose, high molecular weight polypropylene of the isotactic or crystalline type. Technically, it has a melt index of 4 at 230° C. and a specific gravity of 0.905. The resin was purchased from the Hercules Powder Company under the trade name of Profax and further identified as No. 6501, and is supplied in the form of natural flakes. Other commercially available grades of unsaturated isotactic polypropylene resins have been tested in accordance with this procedure with the result obtained being in general agreement.

What is claimed is:

1. A solid polymer composition comprising a solid polymer selected from the class consisting of a hydrocarbon polymer, a polyester, a polyvinylchloride and mixtures thereof, and as a stabilizer therefor, an ultraviolet stabilizing quantity of a polymethylene sulfide having the formula:

$$(R-S)_n$$

wherein R is a methylene group and $n$ is a number in the range from 2 to 5000 inclusive.

2. The composition according to claim 1 wherein the solid polymer is a poly-alpha-olefin.
3. The composition according to claim 2 wherein the poly-alpha-olefin is polypropylene.
4. The composition according to claim 2 wherein the poly-alpha-olefin is polyethylene.
5. The composition according to claim 1 wherein the solid polymer is a polydiolefin.
6. The composition according to claim 1 wherein the stabilizer is present in an amount ranging between 0.1 to 10% by weight.

References Cited

UNITED STATES PATENTS

| | | | |
|---|---|---|---|
| 3,351,678 | 11/1967 | McBurney | 260—897 |
| 3,377,408 | 4/1968 | Edmonds, Jr. | 260—897 |
| 3,454,511 | 7/1969 | Wollrab et al. | 260—23 |

DONALD E. CZAJA, Primary Examiner

R. A. WHITE, Assistant Examiner

U.S. Cl. X.R.

260—865, 887, 897 R, 899